(12) United States Patent
Majka (10) Patent No.: US 9,358,959 B2
(45) Date of Patent: Jun. 7, 2016

(54) BICYCLE WHEEL CLEANING SYSTEM

(71) Applicant: Craig Majka, Binghamton, NY (US)

(72) Inventor: Craig Majka, Binghamton, NY (US)

(*) Notice: Subject to any disclaimer, the term of this patent is extended or adjusted under 35 U.S.C. 154(b) by 0 days.

(21) Appl. No.: 14/836,777

(22) Filed: Aug. 26, 2015

(65) Prior Publication Data

US 2016/0059922 A1 Mar. 3, 2016

Related U.S. Application Data

(60) Provisional application No. 62/042,380, filed on Aug. 27, 2014.

(51) Int. Cl.
*B60S 1/68* (2006.01)
*B62J 99/00* (2009.01)

(52) U.S. Cl.
CPC .. *B60S 1/68* (2013.01); *B62J 99/00* (2013.01); *B62J 2099/0066* (2013.01)

(58) Field of Classification Search
CPC ............ B62J 99/00; B62J 15/00; B62J 15/02; B62J 15/04; B60S 1/62; B60S 1/66; B60S 1/68; B60S 1/685; B62D 25/16; B62D 25/161; B62D 25/163; B62D 25/166; B62D 25/18; B62D 25/182

USPC ....................... 280/855, 158.1, 856
See application file for complete search history.

(56) References Cited

U.S. PATENT DOCUMENTS

| 719,608 | A | * | 2/1903 | Peterson | ............... B62J 6/20 15/160 |
| 1,272,352 | A | * | 7/1918 | Allen | ................. B60S 1/68 280/855 |
| 5,430,906 | A | * | 7/1995 | Drury | ............. B62D 25/182 15/160 |
| 6,434,781 | B1 | * | 8/2002 | Guerra | ................ B60S 1/685 15/160 |

* cited by examiner

*Primary Examiner* — John Walters (57) ABSTRACT

A bicycle wheel cleaning system is used to clear dirt and debris from one or more of the wheels of a bicycle. The system includes at least one wheel cleaning assembly which is attached to a bicycle. The at least one wheel assembly is used to easily clean the wheel of a bicycle and includes a brush, a pushrod, a housing sleeve, and a spring-loaded control mechanism. The brush may be pressed against the wheel of the bicycle to clear debris. The push rod is used to move the brush towards or away from the wheel depending on if the wheel needs to be cleaned. The spring-loaded control mechanism interacts with the pushrod to either push the brush towards or away from the wheel. The housing sleeve is used to protect the spring-loaded control mechanism and to limit how far the pushrod may be moved.

10 Claims, 8 Drawing Sheets

SECTION B-B

DETAIL A

SECTION B-B
FIG. 5

DETAIL C

FIG. 6

DETAIL D
FIG. 7

DETAIL E
FIG. 8

BICYCLE WHEEL CLEANING SYSTEM

The current application claims a priority to the U.S. Provisional Patent application Ser. No. 62/042,380 filed on Aug. 27, 2014.

FIELD OF THE INVENTION

The present invention relates generally to bicycles. More specifically, the present invention is a bicycle wheel cleaning system can be used to remove dirt and debris from the wheels of the bicycle to help prevent nicks, tears, flats and blowouts.

BACKGROUND OF THE INVENTION

Road bicycles use narrow tires with little or no tread that are inflated to very high pressures (80 to over 100 psi or more). These tires, and the tires of various other types of bicycles, are very susceptible to nicks, tears, flats, and blowouts from debris such as pebbles, dirt, sand, broken glass, etc. that can be prevalent on the roads and paths that cyclists frequently ride on. Presently, there is no effective method of removing debris that gets stuck to one or both tires, while the bicycle is in motion. If ignored, such debris can lead to the problems previously disclosed.

Accordingly, there is a present need for a means of easily and effectively cleaning the wheels of a bicycle. The bicycle wheel cleaning system may be used to solve this problem. The system provided does not interfere with shifting, breaking, or steering, but may be easily accessed by the rider. The system includes at least one wheel cleaning assembly which uses a brush to clear any debris that may be present on the wheel of the bicycle. The rider simply needs to give a quick press to an actuation button or an actuation lever of the wheel cleaning assembly to press the brush against the wheel of the bicycle via a pushrod. The present invention can be used as a retrofit system for existing bicycles or may be manufactured for use with new bicycles.

DETAILED DESCRIPTION OF THE INVENTION

All illustrations of the drawings are for the purpose of describing selected versions of the present invention and are not intended to limit the scope of the present invention.

Figure 1:
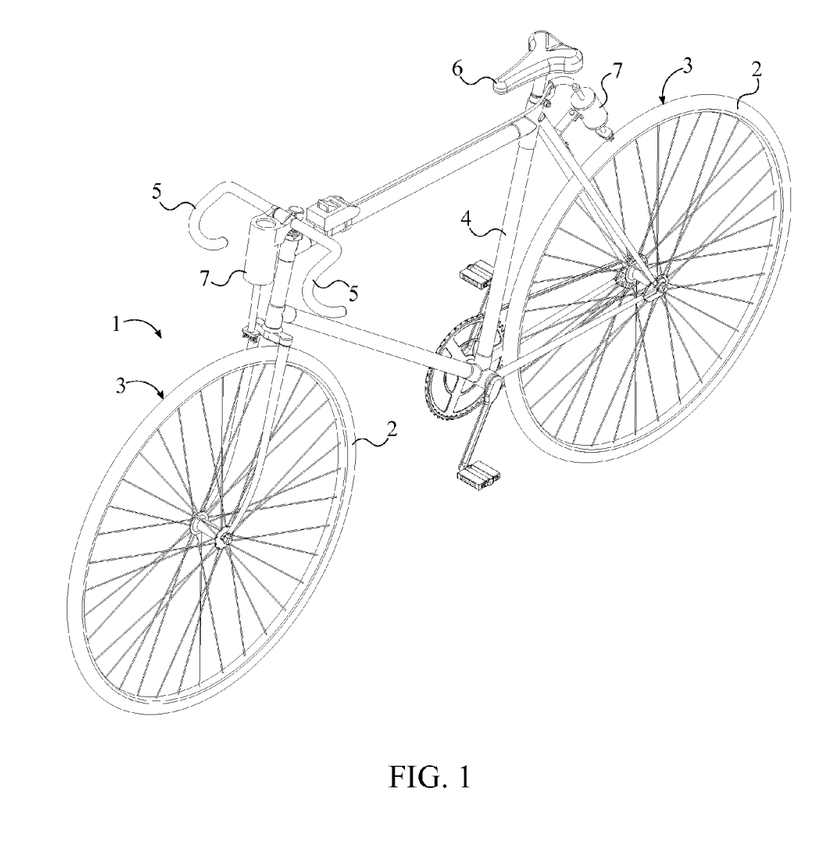
FIG. 1 is a front perspective view of the present invention.
Figure 5:
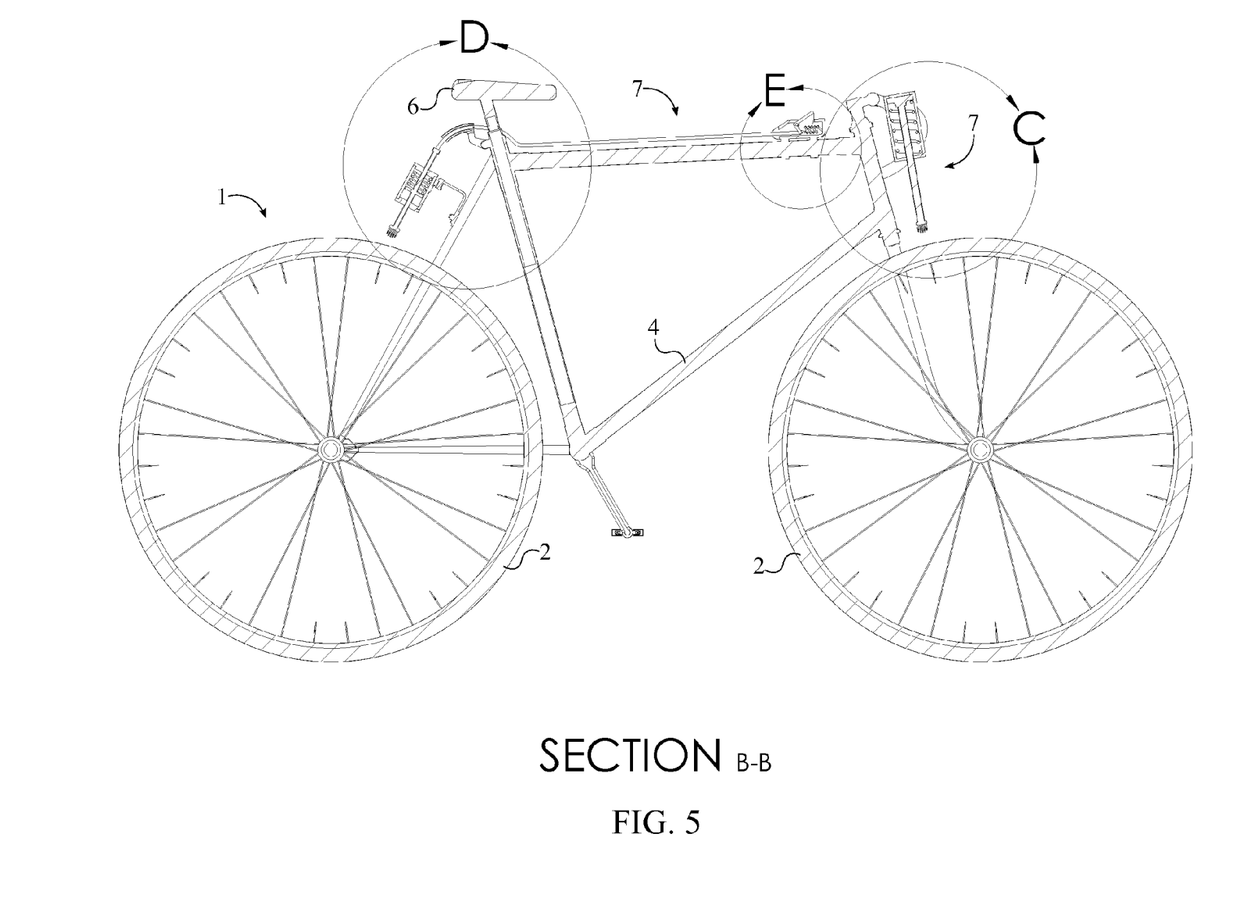
FIG. 5 is a front section view of the present invention taken along the line B-B in FIG. 4.
Figure 6:
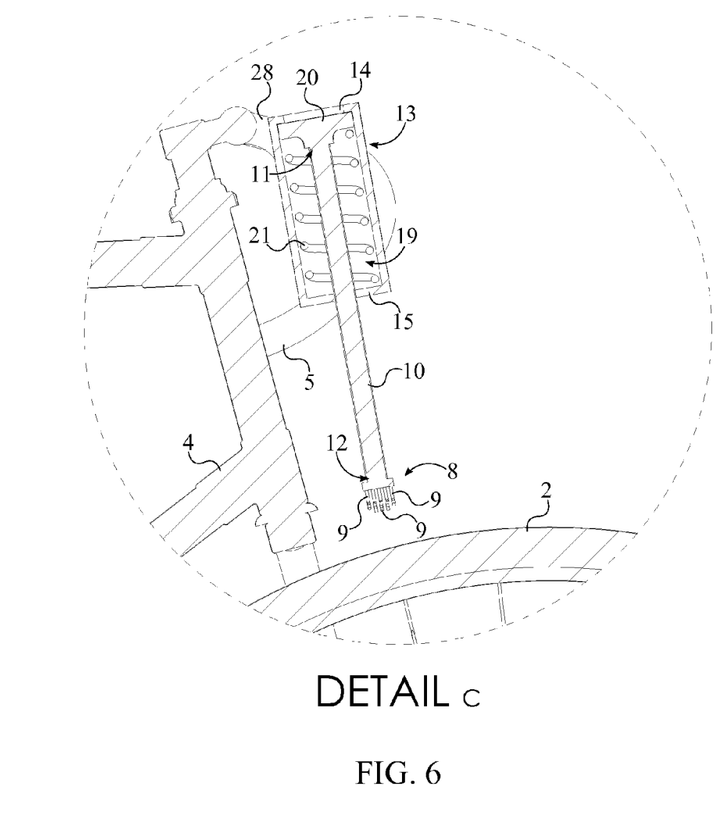
FIG. 6 is a magnified front view of the present invention taken about the circle C in FIG. 5.

With reference to FIG. 1 and FIGS. 5-6, the present invention is a bicycle wheel cleaning system which is used to remove dirt and debris from bicycle wheels while in motion. The present invention comprises a bicycle 1 and at least one wheel cleaning assembly 7. The bicycle 1 comprises a wheel 2 and a bicycle frame 4 and may resemble a road bicycle, a Bicycle Motocross (BMX) bike, a mountain bike, or any other type of bicycle. The at least one wheel cleaning assembly 7 is used to clean the wheels 2 of the bicycle 1 and comprises a brush 8, a pushrod 10, a housing sleeve 13, and a spring-loaded control mechanism 19. The brush 8 is positioned adjacent to a lateral portion 3 of the wheel 2 and can be pressed against the wheel 2 to remove debris from the wheel 2. A plurality of bristles 9 for the brush 8 are oriented towards the lateral portion 3 of the wheel 2. The plurality of bristles 9 is arranged such that when the brush 8 is pressed against the wheel 2, each of the plurality of bristles 9 contacts the wheel 2 at roughly the same time and with the same pressure. A distal end 12 of the pushrod 10 is attached adjacent to the brush 8. The pushrod 10 is slidably engaged through the housing sleeve 13 and provides a means of extending the brush 8 to the lateral portion 3 of the wheel 2. The housing sleeve 13 is externally mounted to the bicycle frame 4. The spring-loaded control mechanism 19 is operatively coupled to the pushrod 10, wherein the spring-loaded control mechanism 19 is used to actuate the pushrod 10 through the housing sleeve 13. The spring-loaded control mechanism 19 is contained within the housing mechanism and allows the user to easily adjust the position of the brush 8 to clean the wheel 2 of the bicycle 1.

Figure 2:
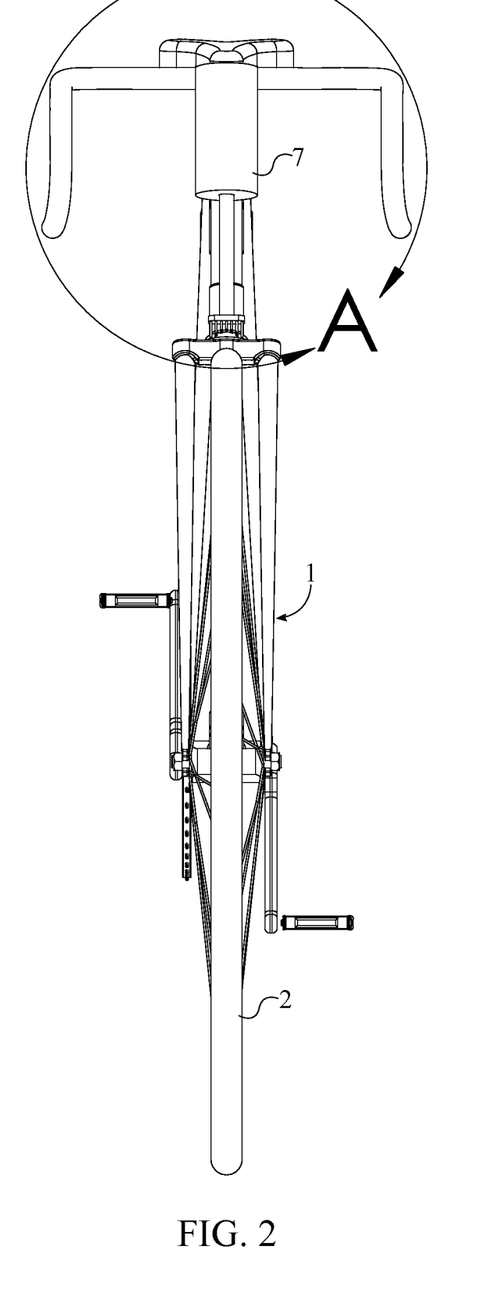
FIG. 2 is a front view of the present invention.
Figure 3:
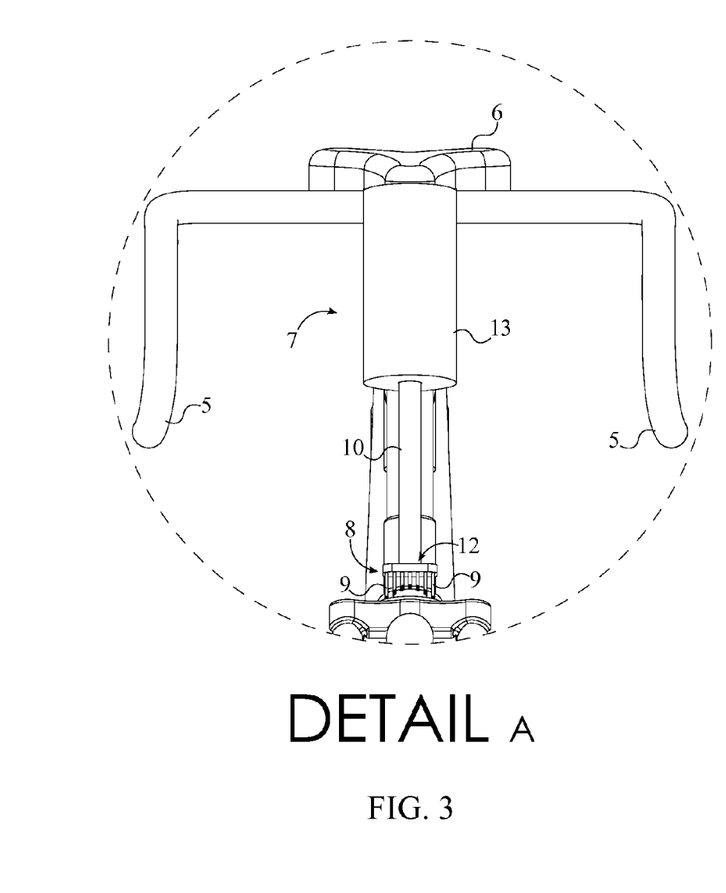
FIG. 3 is a detailed front view of the present invention taken about the circle A in FIG. 2.

In a first embodiment of the present invention, the wheel cleaning assembly 7 is attached to a handlebar 5 of the bicycle frame 4 and is used to clean the wheel 2 situated near the handlebars 5 of the bicycle 1. In reference to FIGS. 2-3 and FIG. 6, the spring-loaded control mechanism 19 comprises an actuation button 20 and a compression spring 21. The actuation button 20 is connected adjacent to a proximal end 11 of the pushrod 10 and is used to control the position of the brush 8. By pressing the actuation button 20, the user is able to move the brush 8 towards the lateral portion 3 of the wheel 2 such that the wheel 2 may be cleaned. The actuation button 20 is positioned adjacent to the handlebar 5 of the bicycle frame 4 such that the user may easily reach the actuation button 20 while riding the bicycle 1. In the preferred embodiment of the present invention, the pushrod 10 is adjustable in length. This allows the present invention to be used on different sized bicycles because the distance between the handlebars 5 and the wheel 2 of the bicycle 1 can vary from bike to bike. The compression spring 21 is positioned within the housing sleeve 13. The compression spring 21 is slidably engaged about the pushrod 10, in between the actuation button 20 and a distal lip 15 of the housing sleeve 13. The compression spring 21 is used to apply a constant force on the actuation button 20 such that the actuation button 20 and the brush 8 may be pushed away from the wheel 2 when the user is not pressing the actuation button 20. When released, the actuation button 20 slides along the inside of the housing sleeve 13 until the actuation button 20 contacts a proximal lip 14 of the housing sleeve 13. The at least one wheel cleaning assembly 7 further comprises a housing bracket 28. The housing sleeve 13 is mounted to the bicycle frame 4 by the housing bracket 28. The housing bracket 28 allows the user easily attach the housing sleeve 13 to the bicycle frame 4, remove the housing sleeve 13 from the bicycle frame 4, or adjust the position of the housing sleeve 13.

In a second embodiment of the present invention, the wheel cleaning assembly 7 is attached near a seat 6 of the bicycle frame 4 but is controlled near the handlebars 5 of the bicycle 1. In reference to FIG. 7, the spring-loaded control mechanism 19 comprises a retainer 22 and a compression spring 21. The housing sleeve 13 comprises a tubular body 16, a first end cap 17, and a second end cap 18. The first end cap 17 and the second end cap 18 are removably attached to the tubular body 16, opposite of each other. This configuration allows the first end cap 17 and the second end cap 18 to be easily removed in case maintenance is needed. The retainer 22 is laterally connected to the pushrod 10 in between the first end cap 17 and the second end cap 18. The compression spring 21 is positioned within the housing sleeve 13 and is slidably engaged about the pushrod 10 in between the first end cap 17 and the retainer 22. Unlike the first embodiment of the present invention, in this embodiment, the compression spring 21 is used to apply a constant force on the retainer 22 in the direction of the wheel 2. Because the retainer 22 is connected to the pushrod 10, as the compression spring 21 pushes the retainer 22, the pushrod 10 and the brush 8 move in the direction of the wheel 2.

Figure 4:
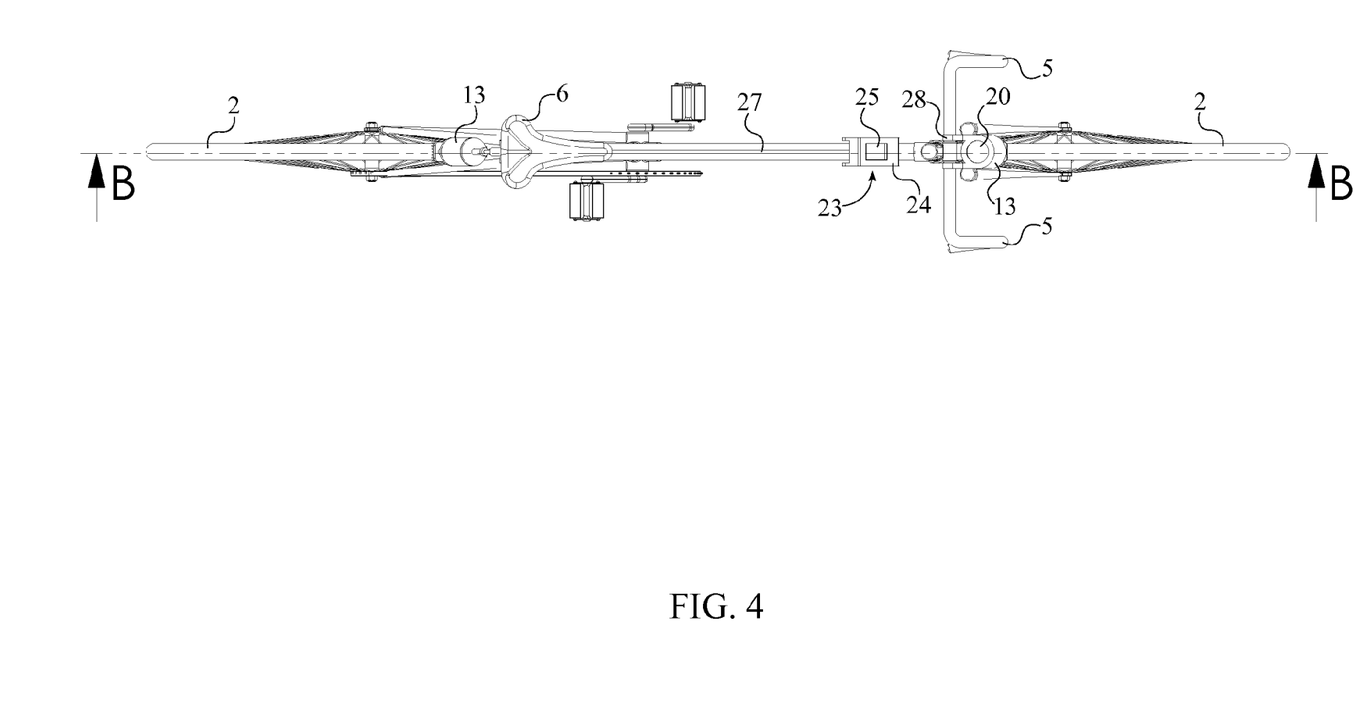
FIG. 4 is a top view of the present invention.
Figure 8:
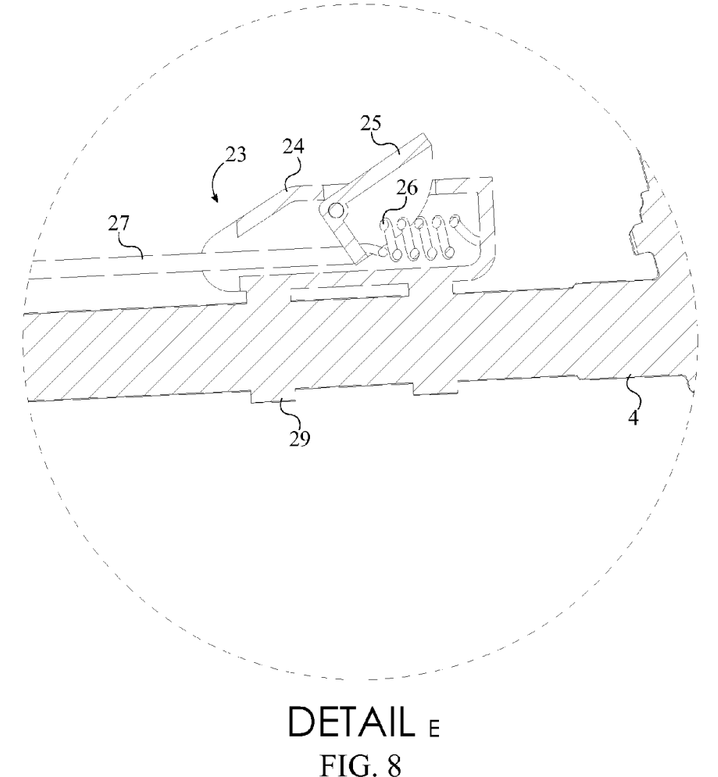
FIG. 8 is a magnified front view of the present invention taken about the circle E in FIG. 5.

In reference to FIG. 4 and FIG. 8, the at least one wheel cleaning assembly 7 further comprises a control unit 23 and an extension cable 27. The control unit 23 is used to prevent the brush 8 from contacting the wheel 2 unless actuated by the user. The control unit 23 comprises a control housing 24, an actuation lever 25, and a tension spring 26. The actuation lever 25 is pivotally attached to the control housing 24 and is used to control the position of the brush 8. The tension spring 26 is tensionably connected in between the control housing 24 and the actuation lever 25. The tension spring 26 is positioned within the control housing 24. The tension spring 26 is used to constantly pull on the actuation lever 25. The extension cable 27 is connected in between the actuation lever 25 and the pushrod 10 and is slidably engaged with the control housing 24. The extension cable 27 allows the actuation lever 25 to control the position of the push rod. The present invention further comprises a control mounting bracket 29. The control housing 24 is laterally mounted to a cross-member of the bicycle frame 4 by the control mounting bracket 29. The control mounting bracket 29 makes it easy to attach, remove, or adjust the control unit 23 based on the preferences of the user.

Figure 7:
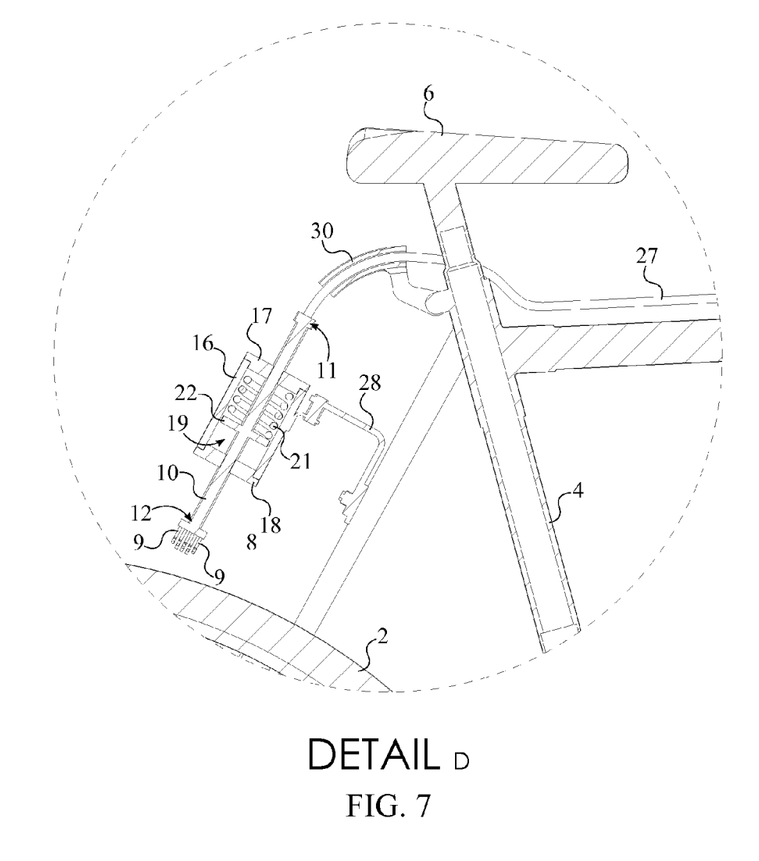
FIG. 7 is a magnified front view of the present invention taken about the circle D in FIG. 5.

In reference to FIGS. 7-8, for the second embodiment of the present invention to work properly, it is necessary that the tension spring 26 is physically configured to apply a greater spring force than the compression spring 21. When the system is at rest, the compression spring 21 applies a force to the pushrod 10 in the direction of the wheel 2. The tension spring 26 applies a force to the pushrod 10 in the opposite direction. In order to prevent the brush 8 from constantly pushing against the wheel 2, the force applied by the tension spring 26 must overcome the force applied by the compression spring 21. When the user pushes the actuation lever 25, the tension spring 26 is extended, creating slack in the extension cable 27. At this point, the force of the compression spring 21 is enough to move the pushrod 10 towards the wheel 2 because the force from the tension spring 26 is balanced by the force applied by the user.

In reference to FIG. 7, the present invention further comprises a cable guide 30. The cable guide 30 is slidably engaged about the extension cable 27 and is connected to the bicycle frame 4, adjacent to the seat 6 of the bicycle frame 4. The cable guide 30 is used to properly align the extension cable 27 with the pushrod 10 and also limit how far the extension cable 27 is able to deviate from a straight path between the control housing 24 and the pushrod 10.

Although the invention has been explained in relation to its preferred embodiment, it is to be understood that many other possible modifications and variations can be made without departing from the spirit and scope of the invention as hereinafter claimed.

What is claimed is:

1. A bicycle wheel cleaning system comprises:
   a bicycle;
   an at least one wheel cleaning assembly;
   the bicycle comprises a wheel and a bicycle frame;
   the at least one wheel cleaning assembly comprises a brush, a pushrod, a housing sleeve, and a spring-loaded control mechanism;
   the brush being positioned adjacent to a lateral portion of the wheel;
   a plurality of bristles for the brush being orientated towards the lateral portion of the wheel;
   a distal end of the pushrod being attached adjacent to the brush;
   the pushrod being slidably engaged through the housing sleeve;
   the housing sleeve being externally mounted to the bicycle frame;
   the spring-loaded control mechanism being positioned within the housing sleeve; and
   the spring-loaded control mechanism being operatively coupled to the pushrod, wherein the spring-loaded control mechanism is used to actuate the pushrod through the housing sleeve.

2. The bicycle wheel cleaning system as claimed in claim 1 comprises:
   the spring-loaded control mechanism comprises an actuation button and compression spring;
   the actuation button being connected adjacent to a proximal end of the pushrod;
   the compression spring being positioned within the housing sleeve; and
   the compression spring being slidably engaged about the pushrod in between the actuation button and a distal lip of the housing sleeve.

3. The bicycle wheel cleaning system as claimed in claim 2, wherein the actuation button is positioned adjacent to a handlebar of the bicycle frame.

4. The bicycle wheel cleaning system as claimed in claim 1 comprises:
   the spring-loaded control mechanism comprises a retainer and compression spring;
   the housing sleeve comprises a tubular body, a first end cap, and a second end cap;
   the first end cap and the second end cap being removably attached to the tubular body, opposite of each other;
   the retainer being laterally connected to the pushrod in between the first end cap and the second end cap;
   the compression spring being positioned within the housing sleeve; and
   the compression spring being slidably engaged about the pushrod in between the first end cap and the retainer.

5. The bicycle wheel cleaning system as claimed in claim 1 comprises:
   the at least one wheel cleaning assembly further comprises a control unit and an extension cable;
   the control unit comprises a control housing, an actuation lever, and a tension spring;
   the actuation lever being pivotally attached to the control housing;
   the tension spring being tensionably connected in between the control housing and the actuation lever;
   the tension spring being positioned within the control housing;
   the extension cable being connected in between the actuation lever and the pushrod; and
   the extension cable being slidably engaged with the control housing.

6. The bicycle wheel cleaning system as claimed in claim 5, wherein the tension spring is physically configured to apply a greater spring force than the compression spring.

7. The bicycle wheel cleaning system as claimed in claim 5 comprises:
   a control mounting bracket; and
   the control housing being laterally mounted to a cross-member of the bicycle frame by the control mounting bracket.

8. The bicycle wheel cleaning system as claimed in claim 5 comprises:
   a cable guide;
   the cable guide being slidably engaged about the extension cable; and
   the cable guide being connected to the bicycle frame, adjacent to a seat of the bicycle frame.

9. The bicycle wheel cleaning system as claimed in claim 1 comprises:
   the at least one wheel cleaning assembly further comprises a housing bracket; and
   the housing sleeve being mounted to the bicycle frame by the housing bracket.

10. The advertisement shelving unit as claimed in claim 1, wherein the pushrod is adjustable in length.

* * * * *